Dec. 30, 1969     J. J. SIMMONS     3,486,230
DENTAL APPLIANCE
Filed May 31, 1966     2 Sheets-Sheet 1
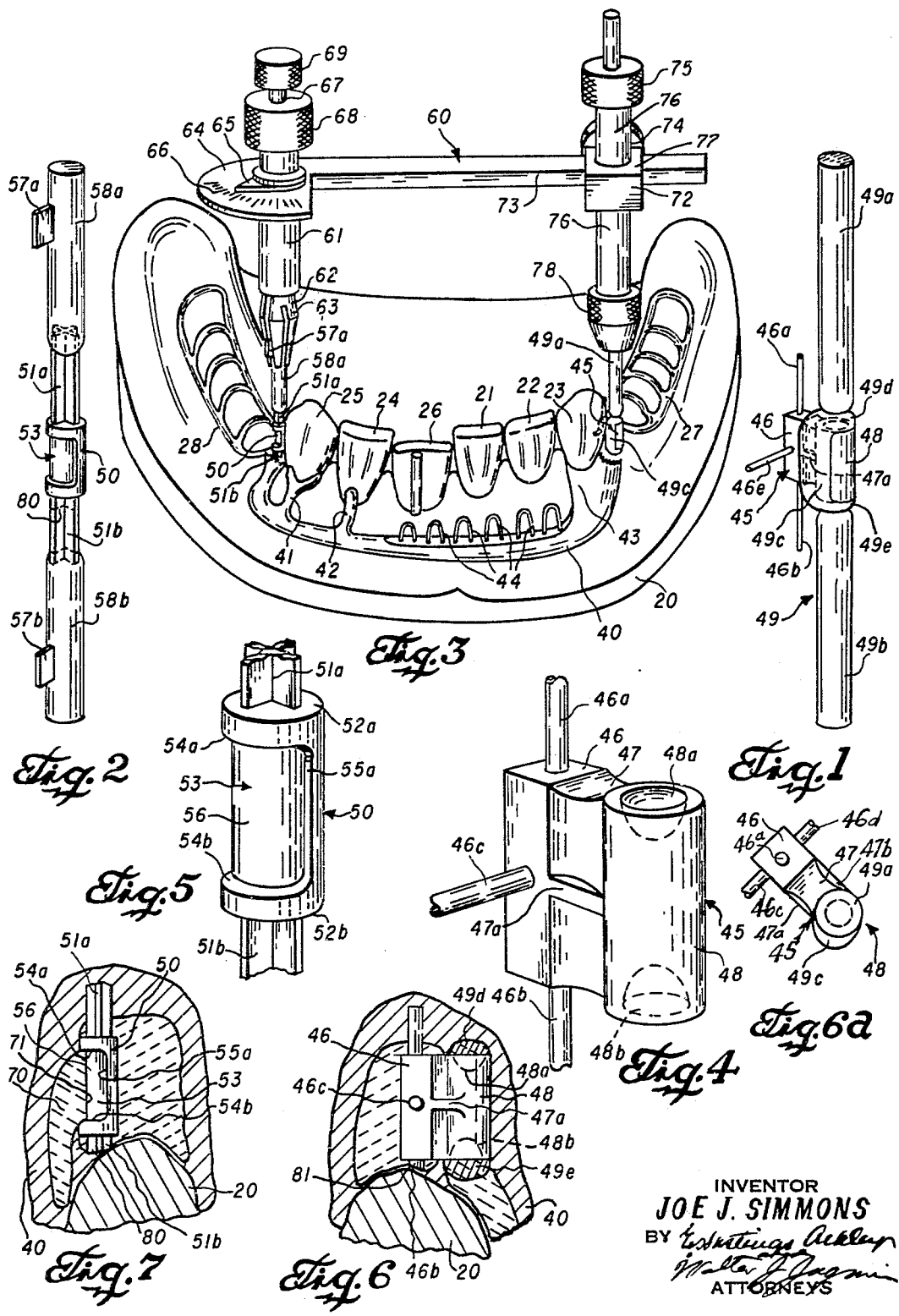
INVENTOR
JOE J. SIMMONS
ATTORNEYS

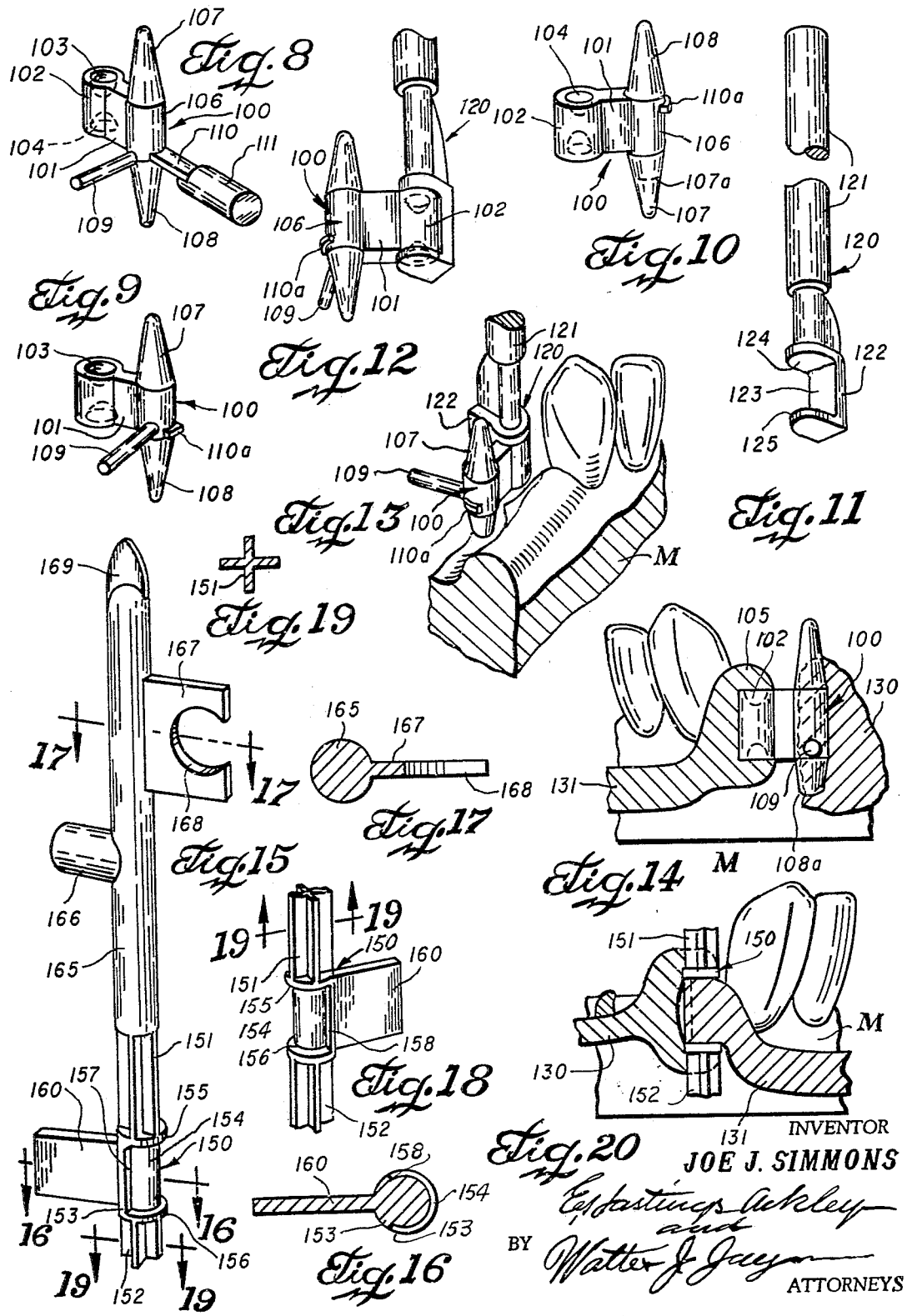

United States Patent Office 3,486,230
Patented Dec. 30, 1969

3,486,230
DENTAL APPLIANCE
Joe J. Simmons, 6440 Patrick Drive,
Dallas, Tex. 75214
Continuation-in-part of application Ser. No. 340,635,
Jan. 28, 1964. This application May 31, 1966, Ser.
No. 553,769
Int. Cl. A61c *13/00*
U.S. Cl. 32—5
25 Claims

ABSTRACT OF THE DISCLOSURE

Members adapted to be secured in a lingual section of a dental appliance for use in said dental appliance for hingedly mounting and releasably securing a labial bar for swingable clamping movement and engagement with respect to a lingual section in said appliance; and patterns for casting such members.

This invention relates to removable dental appliances and to the methods and apparatus for making the same, and more particularly to hinge members and latch members for dental appliances applicable in the fields of prosthetic, restorative periodontal and orthodontic dentistry, and the methods and means for making the same. This application is a continuation-in-part of my co-pending application Ser. No. 340,635, filed Jan. 28, 1964 and now Patent No. 3,271,858, issued Sept. 13, 1966.

With the loss of natural teeth necessitating the installation of a partial denture or dental appliance, there are certain conditions attending the loss and subsequent substitution which are recognized as being important factors controlling the proper functioning of the dental appliance. Among the factors affecting the choice of dental appliances are the shrinking of the gums, the reduction or removal of the alveolar process or foundation upon which the prosthetic appliance is partially supported, often in multiple tooth loss the reduction of the alveolar processes is to such an extent that the lingual sulcus is substantially eliminated, that the retromolar pads are obliterated, and the buccal bearing area may be extremely narrow or small. In addition, the removal of all the molar teeth may have reduced the number of abutments available for anchoring and supporting the appliance, and the few remaining teeth may be mobile.

Thus, the loss of the natural teeth may present weak abutments, or unilateral abutments, or abutments which are unsuited for clasping or for restorative procedures because of the mobility, alignment and location of the remaining teeth, and the patient may require a removable appliance for the practice of proper oral hygiene to maintain the health of the remaining teeth.

It is, therefore, one object of the invention to provide for use in an improved dental appliance which may be removably locked in place, and which is provided with means resisting dislodgment, lateral displacement, tipping action or rotary movement of the appliance, hinge means and latch means for use in securing means which accomplishes such a result without undue force applied to any one or all of the remaining natural teeth.

Still another object of the invention is to provide for use in a dental appliance of the character set forth which is securely latched or locked in place by means of a swingable labial bar and lingual section hinge means for swingable connecting the labial bar at one end to the lingual section and latch means adapted to be secured to the lingual section for latching the free end of the labial bar to the lingual section to securely lock the encompassed remaining teeth between the lingual section and labial bar, which latch means is releasable to permit the labial bar to swing outwardly to free the appliance for removal.

Still another object of the invention is to provide an improved hinge member for use in a dental appliance having labial bar and lingual section castings to provide a hinged connection for the labial bar with the lingual section for swingably connecting the labial bar to the lingual section; and to provide a latch member for incorporation into the lingual section casting to provide means for releasably securing the free end of the labial bar to the lingual section casting to lock and secure the appliance in place.

Still another object is to provide a pre-cast metal hinge member and a pre-cast metal latch member of the character set forth which lend themselves to secure placement in the investment mold and are incorporated in the dental appliance by means of the lost-wax technique of metal casting, and which assure a satisfactory movable hinged mounting of the labial bar on the appliance and latching engagement of the labial bar with the appliance.

A further object is to provide a pre-cast metal hinge member with attached aligning rods which may be distributed, as such, to dental laboratories and the like, and which comprises a pre-cast metal hinge member for attachment to one of two sections of a dental appliance and having a first part on said member eliminatable by heat from a mold and formed with oppositely extending and generally transversely disposed anchoring or positioning means on such pre-cast metal hinge member adapted for engagement with the investment mold for holding the metal hinge part in position for casting a second hinge part in direct hinged coaction with the first hinge part in such a manner that a hinge connection is formed which permits relative swinging movement between the two parts to allow relative swinging and clamping movement of the two sections of the appliance.

Another object of the invention is to provide a pre-cast metal latch member with alignment rods and tabs of plastic or metal which may be distributed as such in the same manner as the hinge member just mentioned and which is adapted for mounting in a lingual section of the dental appliance wax-up for coaction with the movable labial bar portion wax-up thereof carried by and movably connected with the lingual section, which latch member is engageable by a catch means formed by casting on the movable labial bar portion of the appliance for securing the labial bar portion in fixed relation with respect to the remainder of such appliance.

A further and important object of the invention is to provide high quality low ash residue plastic patterns for use in casting hinge members and lock members of the character set forth, from which molds may be made for casting one of a plurality of the hinge members and lock members or latch members, as desired.

A further object is to provide a high quality low ash residue plastic pattern for a hinge alignment tool adapted to be used in positioning the hinge member in the dental appliance.

Still a further object of the invention is to provide a method of casting the hinge members and latch members of the invention preliminary to subsequently casting the same in the dental appliance.

Additional objects and advantages of the invention will be readily apparent from the reading of the following description of a device constructed in accordance with the invention, and reference to the accompanying drawings thereof wherein:

FIGURE 1 is an isometric view of a pre-cast metal hinge socket member and handling means designed for use in carrying out the method and producing the appliance of the invention;

FIGURE 2 is an isometric view of a pre-cast metal latch member and handling means for use in conjunction with the hinge member of FIGURE 1;

FIGURE 3 is a perspective view of a typical lower investment model, showing the manner in which the hinge member and latch member and are positioned in the wax-up of the design of a typical case under construction;

FIGURE 4 is an enlarged isometric view of the pre-cast metal hinge socket member of FIGURE 1;

FIGURE 5 is an enlarged isometric view of the pre-cast metal latch member of FIGURE 2;

FIGURE 6 is a vertical sectional view through the investment model, showing the disposition of the pre-cast metal hinge socket member and its remaining handling means in the wax-up in the investment mold;

FIGURE 6a is a top end view of the hinge socket member and handling means of FIGURE 1;

FIGURE 7 is a view similar to FIGURE 6 showing the disposition of the pre-cast metal latch member of FIGURE 5 in the investment mold;

FIGURE 8 is an isometric view of one side of a modified form of a hinge member or plastic pattern of a member of the invention;

FIGURE 9 is a similar view of the hinge member of FIGURE 8 with a portion of the casting removed;

FIGURE 10 is a view, similar to FIGURE 9, of the opposite side of the hinge member with the ends of the hinge member reversed in vertical position;

FIGURE 11 is a fragmentary isometric view of a positioning tool or aligning rod for use in positioning the hinge members in proper position in the investment model;

FIGURE 12 is a fragmentary isometric view showing a hinge member positioned in the aligning tool of FIGURE 11 ready for positioning on the investment model;

FIGURE 13 is a fragmentary isometric view, partly in elevation and partly in section, showing a hinge member disposed by means of the aligning tool in place on the stone model preparatory to incorporation into the wax-up;

FIGURE 14 is a view, partly in elevation and partly in section, showing the hinge member incorporated in the wax-up, and the manner in which the hinge member is adapted to be incorporated in the wax-up of the swingable labial bar and lingual section of a dental appliance;

FIGURE 15 is an enlarged isometric view of a modified latch member or plastic pattern of a latch member and aligning rod adapted for use in the forming of dental appliances having a latch member of the invention incorporated therein;

FIGURES 16 and 17 are horizontal cross-sectional views taken on the lines 16—16 and 17—17 of FIGURE 15;

FIGURE 18 is a view of the latch member of FIGURE 16 with the positioning or aligning portion thereof removed;

FIGURE 19 is a horizontal cross-sectional view taken on the line 19—19 of FIGURE 18; and, FIGURE 20 is an enlarged view, partly in elevation and partly in section, showing the manner in which the latch member of the invention is incorporated in the wax-up of the investment model.

In the drawings, FIGURE 3, there is shown a lower investment model 20 of a person's mouth in which the natural teeth remaining comprise the lower left central incisor 21, the lower left lateral incisor 22, and the lower left cuspid 23, and the lower right lateral incisor 24 and the lower right cuspid 25. A backing or support for a replacement for the lower right central incisor 26 is shown disposed in position for waxing in the lingual section of the appliance. Also, the lower left saddle skeleton 27 and lower right saddle skeleton 28 are formed of plastic or wax on the investment model.

In the investment model as represented in FIGURE 3, the cuspid teeth 23 and 25 are the most distal abutment teeth and there is no molar abutment tooth present for supporting the appliance. A wax form of the usual lingual section, which may be the usual solid continuous metal section or may be an openwork or skeleton for tooth and tissue replacement, is formed in the usual manner on the lingual portion of the remaining natural teeth and the lingual alveolar section of the investment model 20, and is joined with the wax saddle skeletons 27 and 28 at the opposite ends thereof. The lingual section may have waxed thereon the backing or support (not shown) for the replacement tooth for the right central incisor.

A wax form of a labial bar 40 is laid out and shaped on the labial portion of the alveolar section of the investment model 20 and is designed to be connected at its opposite ends with the lingual section in a manner which will hereinafter be more fully set forth. The labial bar 40 may include upright splinting struts, posts or supports 41, 42 and 43 and may be provided with a plurality of retention loops 44 for the reception and retention of plastic characterized tissue replacement, as will hereinafter be more fully explained.

As shown in FIGURE 3, a pre-cast metal hinge member 45 is disposed in the wax-up of the lingual section at a distal position with respect to the lower left cuspid 23, and a pre-cast metal latch pin or member 50 is disposed in the wax-up of the lingual section of the appliance at a distal position with respect to the lower right cuspid 24.

The pre-cast metal part of the hinge member is shown in an enlarged view in FIGURE 4 and includes a rectangular base portion 46 having a concave lateral arm section 47, formed with medial laterally extending strengthening ribs 47a and 47b (FIG. 6a, supporting a cylindrical socket member 48 formed with opposed concave recesses 48a and 48b in its opposite ends for receiving trunnions formed by casting on one end of the labial bar 40 as will herinafter be more fully explained.

Longitudinally extending investment retainer posts 46a and 46b and laterally extending investment retainer posts 46c and 46d (FIGURES 4 and 6a), hereinafter generally referred to as investment retainer posts or means, project from the rectangular base portion 46 to the hinge member 45 and are adapted to be positioned in the investment mold for holding the hinge member in position during the burn out and casting of the metal lingual section and labial bar by the lost-wax casting process. A portion of each of the posts 46a–46d, the rectangular base portion 46 and a portion of the concave lateral arm section 47 adjacent the rectangular base 46 are also disposed in the wax model of the lingual section as clearly shown in FIGURE 6; whereby the engagement of the posts and the rectangular base section of the hinge member with the metal forming the lingual section positively mechanically bonds or secures the hinge member in fixed position to the lingual section.

The latch member or pin 50 is preferably provided with cruciform longitudinally axially extending retainer sections 51a and 51b, hereinafter generally referred to as retainer sections 51, at its opposite ends, said cruciform retainer sections projecting from substantially transverse planar end surfaces 52a and 52b at the opposite ends of the latch member. The latch member is generally cylindrical in configuration and has a relieved lock or latching section 53 formed thereon and extending peripherally through approximately 180 degrees or half the circumference of the member. The recess is provided with an indinally of said latch pin 50 by the shoulders 54a and 54b. and an inwardly extending upwardly facing lower shoulder 54b, and the bottom of 56 of the recess is generally cylindrical in configuration and is defined by longitudinal inwardly extending lateral shoulders 55a and 55b (FIGURE 16), whereby a catch 70 formed on the free swinging end of the labial bar 40 may engage within the recess and be limited against movement vertically or longitudinally of said latch pin 50 by the shoulders 54a and 54b. Similarly the shoulders 55a and 55b provide abutments for limiting lateral swinging movement of the labial bar, while the curved cylindrical bottom 56 of the recess is engaged by the catch member of the labial bar, as will hereinafter be more fully explained, to retain the labial bar in supporting retaining position with respect to the lingual bar and the natural teeth encompassed or confined therebetween.

As is clearly shown in FIGURE 3, the hinge member 45 and the latch pin 50 are held in parallel relationship by means of a surveying or aligning and indexing device or fixture 60 having on one end a chuck sleeve 61 having a collet 26 for receiving one of the handling means or supporting shafts 58a or 58b formed of plastic, metal or the like cast on opposite ends of the curciform retainers 51a and 51b of the latch pin 50. The cylindrical plastic extensions 58a and 58b have provided thereon positioning flanges 57a and 57b which project radially from and extend longitudinally of the cylindrical extensions in longitudinal alignment with each other and in a plane extending centrally and radially through the lock recess 53 of the latch pin. The flanges serve as orienting members for angularly orienting the position of the cut-away lock recess 53 of the latch pin 50. The flanges are adapted to be disposed in a longitudinally extending groove or slot 63 formed in the collet member 62 to be turned thereby. The collet member is securely wedged into the lower end of the check sleeve 61 whereby the collet member is rotated with the sleeve 61 as the sleeve is rotated in the indicator end 64 of the fixture 60. A pointer 65 is connected with the sleeve 1 and moves therewith over a scale 66 on the upper surface of the indicator end portion 64 of the fixture. The collet 62 is drawn into frictional gripping engagement with the extension 57a by a bolt member 67 threaded into the sleeve 61, the sleeve having a knurled head 68 and the bolt member having a knurled head 69 by means of which each may be held for relative rotation to draw the collet into clamping engagement with the extension 57a. The indicia of the scale 66 are divided into angular increments for the purpose of orienting the relieved latching portion 53 of the latch pin 50 with respect to the labial bar 40 to assure that the catch of the labial bar, to be hereinafter more fully described, is properly engaged therewith.

The hinge member 45 is similarly provided with handling means generally designed as 49, which handling means includes extension members 49a and 49b formed of plastic or the like at the opposite ends of the hinge member and disposed in longitudinal axial alignment with the cylindrical socket section 48 of the hinge member whereby the hinge member may be disposed in accurate parallel operating relationship with the latch pin 50 by means of the fixture. One of the extension members 49a or 49b is slidably disposed with a close sliding fit in the lower bore of a chuck 78 carried on the lower end of a sleeve 76 which is slidable longitudinally on the slide member 77 slidably carried on the bar 73 of the fixture 60. A lockscrew 74 secures the slide 72 in adjusted positions on the bar with respect to the chuck sleeve 61 on the opposite end of the fixture. A knurled finger piece 75 on the upper end of the sleeve 76 is used for rotating the sleeve about its longitudinal axis and the chuck 78 holds the hinge member in its vertical position extending parallel to the latch pin member 50 carried by the collet member 62 at the opposite end of the fixture.

It will thus be seen that the hinge member and the latch pin are disposed in parallel relationship to each other and may be disposed at any desired position with respect to the lingual section of the dental appliance whereby the labial bar 40 carried by the hinge member 45 will swing about the vertical axis of the hinge socket section between the recesses 48a and 48b. Thus, the labial bar 40 will always swing about the longitudinal axis of the cylindrical socket section 48 of the hinge member 45, and the catch 70 on the opposite swingable end of the labial bar will be moved in a plane perpendicular to the axis of such socket member and into and out of engagement with the cut-away latch portion 53 of the latch pin 50, as will hereinafter be more fully explained.

The plastic extensions 49a and 49b of the handling means 49 on the hinge member are connected to a central plastic hinge trunnion portion 49c which is disposed laterally of the socket portion 48 of the hinge member and which is connected at its opposite ends to the extensions by means of lateral trunnion extensions 49d and 49e which overlie the ends of the socket portion 48 and extend into the sockets 48a and 48b to form the casting cavity for the trunnion portions of the hinge on the labial bar when the plastic portion is burned away during the lost wax-process.

As shown in FIGURE 6a, the C-shaped trunnion section of the handling means 49 for the hinge member overlies only that portion of the hinge member formed by the socket section 48, the inwardly extending lateral extensions 49c and 49d covering the ends of the socket portion 48 and the trunnion portion 49c lying along the cylindrical portion of the socket section at a position offset somewhat angularly from the concave lateral arm section 47 of the hinge member as shown in FIGURE 6 so that when the plastic is burned off in the lost-wax process, the metal casting of the labial bar will fill the space formerly occupied by the trunnion portion 49c, as well as the portions occupied by the lateral extensions 49d and 49e to form a continuous one piece metal hinge trunnion at that end of the labial bar. As is shown in FIGURES 3 and 6a, the wax form for the labial bar 40 is brought into abutting continuity with the trunnion portion 49c and the lateral extensions 49d and 49e, so that the wax form of the labial bar and the plastic trunnion portion and the lateral extensions form a continuous cavity in the investment mold when burned out, whereby when cast the trunnions are an integral part of the labial bar.

At its latch end, the labial bar is formed with a catch member 70 which is shaped of wax on the pre-cast metal latch member in the recess 53 in such a way that a semicircular concave hook or catch recess 71 is formed therein corresponding to the latching recess 53 of the latch pin. The wax is so shaped that the catch portion of the labial bar enters the recess 53 and, when the wax is burned away in the lost-wax process and the metal is cast, the metal of the labial bar forms a hook type catch 70 having a hook recess 71 which engages in the latching recess 53 to positively retain the labial bar in the closed supporting position. It will be noted that the recess 71 is so disposed with respect to the recess 53 that when the labial bar is in closed position the extreme outer tip portion 72 of the catch is disposed in a portion of the recess 53 which is nearer the hinge socket 48 than is the outer portion of the bottom 56 of the latching recess, so that the catch is held against ready displacement from its position in the recess and the labial bar is firmly restrained in its closed position. It will be noted that the recess 53 forms an excellent guide or mold for the waxings of the catch member 70, as shown in FIGURE 7.

As shown in FIGURES 3, 6 and 7, the lower retainer portions of the latch pin 50 and of the hinge member 45 are cut away, as shown at 80 on the latch pin and as shown at 81 on the hinge, whereby the cruciform retainer 51b of the latch pin is shortened and may touch but does not engage the alveolar process portion of the investment model, and the lower retainer shaft 46b of the hinge member likewise does not engage the alveolar process portion of the investment model at that point. This permits placement of the hinge member and the latch pin at any desired vertical position with respect to the investment model and the elements of the dental appliance to secure the desired results. It will also be noted that the lateral retainer shaft 46c of the hinge member is trimmed, to fit the base of the hinge into close proximity to the most distal abutment 23 of the appliance.

After the members have been properly disposed in the wax form, the plastic handling means 49 for the hinge member above the socket section thereof is cut away above the lateral trunnion extension 49d and the cruciform retainer member 51a is likewise cut away slightly above the upper surface of the wax form of the lingual section to permit the forming of the complete investment mold about the investment model and completed wax-up. The retainers 51a and 51b for the latch pin and the retainers 46a, 46b, 46c and 46d for the hinge member are then disposed in the investment mold when the same is formed and will securely retain their position when the wax and the volatile plastic is burned away during the lost-wax processing of the investment mold.

It will be readily apparent that the upper and lower portions of the handling means of the latch member are mirror images of each other, as are the upper and lower portions of the handling means of the hinge member, so that the members can be reversed in position on the appliance; i.e., the positions in which they are shown in the drawing.

The plastic material of which the position flanges and handling means of the latch member and the handling means, hinge trunnion portions and lateral extensions of the hinge member are formed is preferably of a volatile plastic, such as polystyrene or the like, whereby when the wax and plastic are burned out in the investment mold in carrying out the lost-wax process of casting the appliance, there will be no residue in the mold cavity and a clean, full casting will be produced.

The labial bar, lingual section, open work and the like are formed on the investment model by "waxing," in which the application of bar sheets, strips and rods of wax or plastic to the outlined design of the investment model by heating, shaping, trimming and smoothing of the wax or plastic until the design of the labial bar, the lingual section and the saddles is achieved. Subsequently, the wax pattern and the plastic portions of the hinge are invested or flasked within a metal ring, and, following the investment, the wax and plastic is burned out of the invested mold in the usual manner to provide a cavity which is an exact duplicate of the desired shape of the metallic frame of the labial bar, the lingual section and the lateral saddles of the dental appliance.

The cavity within the investment mold and around the model is then cast with molten metal from a crucible, which metal is carried to the inner molds by suitable sprues or passages. The metal preferably used is a chrome cobalt alloy, which may be any one of several on the market, or any other suitable material which is of a high melting point, high strength and rigidity. While a chrome cobalt alloy is preferred, other metallic compositions such as a high strength heat treated gold, such as ADA Type D gold, or the like may be used. Following the casting of the molten metal into the cavity in the investment mold and the cooling of the metal, the investment mold is cracked and the metallic frame is removed for the technician's further work involving grinding, polishing, shaping and general finishing of the casting. At this time, and projecting portions of the retainer shafts or cruciform retainers for the hinge member and for the latch member are ground and polished flush. Also, because of the characteristics of the chrome cobalt alloys, the performed surfaces of the pre-cast hinge member 45 and of the pre-cast latch member 50 which are exposed in the mold oxidize and do not fuse with the metal cast into the investment mold. The oxidized surfaces, which prevent fusion of the form metal and the cast metal, may be separated and thus permit movement of the labial bar with respect to the remainder of the appliance. If gold metal is used for the casting, it may be pre-oxidized with Anti-flux to prevent fusion of the labial bar with the lingual section hinge member and latch member. Cleaning will facilitate pivotal movement of the labial bar on the hinge member 48 and the engagement of the catch 70 with the latch pin 50. It will also be noted that in the contraction and cooling of the cast labial bar, the male trunnion members will reduce slightly in size and therefore be slightly smaller than the sockets 48a and 48b, and will provide a more freely movable hinge connection with the socket member 48. Likewise, the catch end 70 of the labial bar, being a female member, shrinks or contracts and moves into tight mechanical engagement with the relieved latching surface 58 of the latch pin.

Following the polishing of the metal framework of the dental appliance, suitable plastic characterized tissue replacements (not shown) and tooth replacements (not shown) are applied to and processed on the saddles 27 and 28, and tissue replacement is applied to and processed on the portion of the labial bar on which the retention loops 44 are formed, all in the usual manner. Similarly, the replacement 26 for the lower right central incisor is affixed to the backing in the usual manner and matched with the tissue replacement to provide a natural appearance.

In use, the appliance is disposed in the mouth with the linguar section 20 in engagement with all the adjacent remaining teeth, and with the saddles 27 and 28 resting on the molar and bicuspid portions of the alveolar process. The labial bar 40, during installation, is moved to the open position wherein the labial bar does not contact any of the natural teeth of the user patient. However, when the appliance has been seated in the mouth with the lingual section and the saddles properly disposed, the labial bar 40 is then swung inwardly toward the teeth to engage the catch member 70 with the latch recess 53 in the latch pin or member to positively clamp the encompassed remaining natural teeth between the labial bar and the lingual section and to provide the other advantages hereinafter set forth.

It is believed readily apparent that, while the dental appliance which has been described heretofore is illustrated and described as being constructed for use on the lower jaw or mandible of the user patient, the same process and procedures, and hinge members, latch members and fixtures may be used in forming and constructing a dental appliance for the upper jaw or maxilla to provide all the same results and advantages which are set forth with regard to the appliance for the lower jaw or mandible. The hinge member and the latch member, each having the handling means extending from opposite ends thereof, are readily adaptable for mounting from either end in a dental appliance, and may be used equally well in either type appliance.

It will thus be seen that improved hinge means and latch means for use in dental appliances have been provided which enable the appliance to be removably locked in place in the mouth of the user, clamping the encompassed natural teeth of the user between the lingual section and the movable labial bar provided on the appliance, to resist dislodgement, lateral displacement, tipping action or rotary movement of the appliance.

It will further be seen that the hinge means and the latch means for the dental appliance are readily adaptable for incorporation in said appliance by the "lost-wax" technique of metal casting, quickly and expiditiously by dental technicians from such improved pre-cast hinge member and pre-cast latch member, which may be sold or distributed, as such, to dental laboratories and technicians for use in constructing the appliances, and which can, when so used, result in the provision of an appliance having the benefits set forth.

A modified form of hinge member 100 and the alignment tool 120 for use therewith are shown in FIGURES 8 through 14, inclusive. The hinge member and the alignment tool may be in the form of a low ash residue plastic pattern from which the metal hinge member and alignment tool may be cast, or may be in the form of the actual metal castings.

The hinge member 100 includes a rectangular central portion 101, which has at one lateral end a substantially cylindrical socket member 102 formed with opposed concave recesses 103 and 104 at opposite ends thereof which are adapted to receive the trunnions formed by the casting process on one end of a labial bar, the wax-up of which is shown at 105 in FIGURE 14. A retainer section 106 is formed on the opposite lateral end of the rectangular central body portion 101 from the socket member, and is substantially cylindrical and has at its opposite ends substantially conical longitudinally axially projecting retaining posts 107 and 108. A lateral cylindrical retaining rod or bar 109 is formed projecting from the retainer section 106 substantially adjacent one end thereof and extends at substantially a right angle to the plane of the rectangular central body portion 101 of the hinge member. The hinge is formed by casting, and a retainer 110 and sprue 111 are formed on the retainer section 106, also projecting therefrom adjacent one end of said section and substantially 180 degrees from the rectangular central body portion 101 of the hinge member. Obviously, after the hinge member has been cast, the sprue portion may be cut in any suitable manner, as by grinding adjacent but spaced from retainer section a short distance, to provide the retainer sprue projection 110a shown in FIGURES 9, 10 and 12 of the drawings. Obviously, if desired, the entire sprue projection or retainer may be ground off flush with the surface of the retainer section 106. If left projecting as shown in FIGURES 9, 10 and 12, however, the sprue retainer will serve as an additional means to prevent displacement of the hinge member from the lingual section of the appliance.

The laterally projecting retainer rod 109 extends from only one side of the cylindrical retainer section 106, but it is obvious that the hinge member may be inverted in position as shown in FIGURE 10 to place the laterally projecting retainer rod on the opposite side of the retainer section. This arrangement reduces the amount of metal necessary to form the hinge and simplifies the casting procedures without reducing the effectiveness of the engagement of the retainer section in the appliance.

A hinge alignment tool 120 for use with the hinge member 100 is shown in FIGURES 11, 12 and 13. The alignment tool is formed with an elongate alignment rod 121 having at one end thereof a substantially C-shaped supporting member 122 providing a recess 123 into which the cylindrical hinge section 102 of the hinge member is adapted to be inserted for positioning of the hinge member in the wax-up of the appliance. The recess 123 has opposed planar abutment surfaces 124 and 125 between which the socket ends 103 and 104 of the cylindrical socket member 102 fit with a frictional engagement, whereby the hinge member is supported by the alignment tool for positioning with respect to the investment model for incorporation in the wax-up of the appliance. In FIGURE 12, the hinge member is shown supported in the alignment tool, and in FIGURE 13, the hinge member is shown positioned adjacent a labial or buccal surface of the stone model M on which the wax-up of the appliance is to be formed. In FIGURE 14 the wax-up of the lingual section 130 and the labial bar section 131 of the appliance are shown in section, with the trunnion section 105 of such labial bar spaced from the lingual section of the appliance to permit free-swinging of the labial bar on the hinge member. The manner in which the hinge member is cast into the appliance is the same as has already been described in connection with the form first illustrated and described. Obviously, the ends of the substantially conical retainer posts 107 and 108 may be cut off, as along the lines 107a or 108a, to enable the hinge member to be disposed at the proper position in the appliance. After the hinge member has been disposed in the wax-up, the projecting portions of the retainer posts 107, 108 and 109 or of the sprue retainer 110, retain the hinge member in position in the wax-up. The appliance may then be cast by the methods already described and any projecting portions of the retainers then cut or ground off.

A modified form of latch or lock member or pin 150 is illustrated in FIGURES 15 through 20. This latch member may also be in the form of a low-ash residue plastic pattern from which the metal latch member may be cast, or may be in the form of the actual metal latch member. In FIGURE 15, the latch member or pin is shown as having integral therewith the alignment rod and indexing tab by means of which the latch member is disposed in proper position in the appliance to effect accurate engagement of the catch on the free end of the swingable labial bar therewith. As shown, the latch member is provided at its opposite ends with cruciform longitudinally axially extending retainer sections 151 and 152, hereafter generally referred to as retainer sections. The retainer sections extend from the opposite ends of the substantially cylindrical latch body portion 153 having the relieved lock or latching section 154 formed therein and extending peripherally through approximately 180 degrees of the circumference of said body portion of the latch member. The recess is provided with an inwardly extending downwardly facing upper shoulder 155, and an inwardly extending upwardly facing lower shoulder 156, and the bottom of the recess is also generally cylindrical in configuration and is defined laterally by opposed longitudinal inwardly extending lateral shoulders 157 and 158 at opposite sides of the recess. The recess and the shoulders formed on the latch member defining the recess provide means with which the catch formed on the free swinging end of the labial bar of the appliance may engage and be limited against movement vertically and longitudinally of the latch pin by the engagement of said catch with the shoulders defining the recess. A retainer sprue or tail piece 160 projects substantially radially from the body 153 of the latch member, and is shown as being substantially rectangular in form and providing a large surface for aligning and preventing movement of the latch member when it has been positioned in the appliance. The aligning rod 165 is shown as formed integral with the latch member 150 and projecting longitudinally axially from the cruciform retainer member 151. The casting sprue 166 formed on the rod may be removed, if desired. However, it forms means for aiding in disposing the hinge member at the proper position in the appliance. An indexing tab 167 is formed on the rod and projects radially therefrom in longitudinal alignment with the center of the locking recess 154 between the shoulders 157 and 158, so that the locking surface may be properly disposed in the lingual section with respect to the swingable labial bar by orienting the indexing tab to the proper position. A substantially circular cut-out 168 may be formed in the indexing tab and may be used to size and clean the cylindrical portion of the latch member, if desired. The circular cut-out 168 may also be used to assure that the socket member 102 of the hinge member is clear and free of any projections which would prevent free swinging movement of the labial bar with respect thereto. Also, a scraper tip or blade 169 may be formed on the end of the alignment rod 165, if desired, for cleaning the concave recesses or sockets 104 in the hinge members.

The aligning and positioning rod 165 is formed on only one end of the latch member, since the latch member may be disposed in either an appliance for the lower jaw or mandible or an appliance for the upper jaw or maxilla. The tail member 160 also provides retaining support for the latch member in certain constructions. The cruciform retainer 151 may be notched before the latch member is disposed in the wax-up of the appliance, or cut away after the latch member has been positioned in the wax-up of the appliance, in the manner previously described.

As shown in FIGURE 20, the latch member provides a means cooperating with the labial bar 131 swingably supported by the hinge member for retaining the appliance in the mouth of the user as has been already described.

The structure shown in FIGURE 8 may be a plastic pattern formed of a high quality low-ash residue plastic, whereby the laboratory constructing the appliance may form the hinge member of the same metal as the remainder of the appliance to eliminate any electrolytic or other corrosive action. The plastic pattern is used to form a mold in which the actual metal hinge member may be cast. The sprue member 111 provides means for connecting the mold cavity with a suitable sprue in the stone mold. Similarly, the latch member 150 and positioning rods 165 may be formed of plastic patterns and the entire latch member and positioning rod cast of metal in the same manner, using the sprue 166 and the projecting tail piece 160 as a sprue to assure proper filling of the mold. It is also desirable, in certain instances, that the plastic pattern of the aligning tool 120 for the hinge member be cast in metal in sufficient numbers to enable the laboratory user of the hinge members to form a single metal aligning tool for use with a plurality of the hinge members.

All the advantages of the hinge member and latch member of the form first described are present in the forms herein illustrated. In addition, some strengthening of the retaining posts of the hinge member and latch member is provided in this modified form. Also, since the hinge member and latch member are reversible in vertical position, some duplication of retainer means and the aligning means has been eliminated.

The foregoing description of the invention is explanatory, only, and changes in the details of the construction illustrated may be made by those skilled in the art.

What is claimed and desired to be secured by Letters Patent is:

1. A member adapted for use in a dental appliance for hingedly mounting and securing a labial bar for swingable clamping movement with respect to a lingual section in said appliance and including: a body portion; retaining means connected with and projecting from said body portion and engageable and securable in said lingual section of said appliance for securing said body portion in place in and against movement with respect to said appliance; and handling means operatively associated with said body portion providing means for positioning said body portion for incorporation in the lingual section of a dental appliance.

2. A pattern for casting a member adapted for use in a dental appliance for hingedly mounting and securing a labial bar for swingable clamping movement with respect to a lingual section in said appliance and including: a body portion; retaining means connected with and projecting from said body portion and engageable and securable in said lingual section of said appliance for securing said body portion in place in and against movement with respect to said appliance; and handling means operatively associated with said body portion providing means for positioning said body portion for incorporation in the lingual section of a dental appliance, wherein the body portion, the retaining means, and the handling means are formed of low-ash residue material.

3. A member adapted for use in a dental appliance for hingedly mounting a labial bar for swingable clamping movement with respect to a lingual section and including: a base portion; retaining means carried by said base portion and projecting therefrom, said retaining means providing for securing and retaining said base portion of said member in a lingual section of a dental appliance against movement with respect to said lingual section; a lateral projecting arm portion carried by said base portion and projecting therefrom substantially normal to said retaining means; and hinge means carried by said laterally projecting arm member and spaced from said base portion and having opposed socket means at opposite ends thereof.

4. A member for use in a dental appliance for hingedly mounting and securing a labial bar for swingable clamping movement with respect to a lingual section in said appliance and including: a body portion having a longitudinal axis and an external latch recess formed therein providing opposed inwardly extending and upwardly and downwardly facing shoulders at the lower and upper ends respectively of said recess; and retainer means projecting longitudinally axially outwardly from at least one of the opposite ends of said body portion.

5. A member of the character set forth in claim 4 for use in a dental appliance wherein said retainer means is cruciform in cross-section.

6. A pattern for casting a member adapted for use in a dental appliance for hingedly mounting a labial bar for swingable clamping movement with respect to a lingual section and including: a base portion; retaining means carried by said base portion and projecting therefrom, said retaining means providing for securing and retaining said base portion of said member in a lingual section of a dental appliance against movement with respect to said lingual section; a lateral projecting arm portion carried by said base portion and projecting therefrom substantially normal to said retaining means; and hinge means carried by said laterally projecting arm member and spaced from said base portion and having opposed socket means at opposite ends thereof, wherein the base portion, the retaining means, the arm portion, and the hinge means are formed of low-ash residue material.

7. A pattern for casting a member for use in a dental appliance for hingedly mounting and securing a labial bar for swingable clamping movement with respect to a lingual section in said appliance and including: a body portion having a longitudinal axis and an external latch recess formed therein providing opposed inwardly extending and upwardly and downwardly facing shoulders at the lower and upper ends respectively of said recess; and retainer means projecting longitudinally axially outwardly from at least one of the opposite ends of said body portion, wherein the body portion and the retainer means are formed of low-ash residue material.

8. A latch member for use in a dental appliance for hingedly mounting and releasably securing a labial bar for swingable clamping movement and engagement with respect to a lingual section in said appliance and including: a body portion having a longitudinal axis and an external recess formed therein and having a projecting cylindrical peripheral base surface extending through an angle of approximately 180 degrees about the longitudinal axis of the body portion and providing opposed inwardly extending and upwardly and downwardly facing shoulders at the lower and upper ends respectively of said recess; and cruciform retainer means projecting longitudinally axially outwardly from the opposite ends of said body portion.

9. A hinge member adapted for use in a dental appliance for swingable hingedly mounting a labial bar for clamping movement with respect to a lingual section in said appliance and including: an elongate base portion; retaining means including a retaining member carried by said base portion and projecting from the side of said base portion and a retaining member projecting from at least one of the opposite ends of said base portion, said retaining members being adapted to be cast in the lingual bar material of the dental appliance for securing said base portion in said lingual bar; a laterally projecting arm portion carried by said base portion and projecting from one side thereof, said arm portion of said projecting arm portion serving to aid in retaining said base portion in said lingual section in said dental appliance; and hinge means carried by said laterally projecting arm portion and spaced from said base portion and having spaced opposed socket means thereon disposed in axial alignment with each other.

10. A pattern for a hinge member adapted for use in a dental appliance for hingedly mounting a labial bar for swingable clamping movement with respect to a lingual section in said appliance and including: an elongate base portion; retaining means including a retaining member carried by said base portion and projecting from the side of said base portion and a retaining member projecting from at least one of the opposite ends of said base portion, said retaining members being adapted to be cast in the lingual bar material of the dental appliance for securing said base portion in sadi lingual bar; a laterally projecting arm portion carried by said base portion and projecting from one side thereof, said arm portion of said projecting arm portion serving to aid in retaining said base portion in said lingual section in said dental appliance; and hinge means carried by said laterally projecting arm portion and spaced from said base portion and having spaced opposed socket means thereon disposed in axial alignment with each other, wherein the base portion, the retaining means, the arm portion, and the hinge means are formed of a low-ash residue material.

11. A hinge member adapted for use in a dental appliance for hingedly mounting a labial bar for swingable clamping movement with respect to a lingual section in said appliance and including: an elongate base portion; retaining means including at least one retaining member carried by said base portion and projecting from the side of said base portion and at least one other retaining member projecting from at least one of the opposite ends of said base portion, said retaining means being adapted to be cast in the lingual section material of the dental appliance for securing said base portion in said lingual section; a laterally projecting reduced arm portion carried by said base portion and projecting from one side theerof in a plane normal to said retaining means, said projecting arm portion serving to aid in retaining said base portion in said lingual section in said dental appliance; hinge means carried by said laterally projecting arm portion and spaced from said base portion and having spaced opposed socket means thereon disposed in axial alignment with each other; handling means operatively engaging and extending axially longitudinally from the socket means of said hinge means.

12. A hinge member of the character set forth in claim 11 wherein the handling means is formed of volatile plastic connected with and extending axially longitudinally from the socket means of said hinge means.

13. A plastic pattern for hinge member adapted for use in a dental appliance for hingedly mounting a labial bar for swingable clamping movement with respect to a lingual section in said appliance and including: a base portion; retaining means including at least one retaining member carried by said base portion and projecting from one side of said base portion and at least one retaining member projecting from one of the opposite ends of said base portion, said retaining means being adapted to be cast in the lingual section material of the dental appliance for securing said base portion in said lingual section; a laterally projecting arm portion carried by said base portion and projecting from one side thereof in a plane normal to said retaining means; hinge means carried by said laterally projecting arm portion and spaced from said base portion and having spaced opposed socket means thereon disposed in axial alignment with each other.

14. A hinge member adapted for use in a dental appliance for hingedly mounting a labial bar for swingable clamping movement with respect to a lingual section in said appliance and including: an elongate base portion; retaining means including a retaining member carried by said base portion and projecting from one side of said base portion and a pair of retaining members projecting from opposite ends of said base portion, said retaining means being adapted to be cast in the metal of the lingual section of the dental appliance for retaining said base portion in said lingual section; a laterally projecting reduced arm portion carried by said base portion and projecting from one side thereof in a plane normal to said retaining means, said projecting reduced arm portion serving to aid in retaining said base portion in said lingual section in said dental appliance; hinge means carried by said laterally projecting arm portion and spaced from said base portion and having spaced opposed socket means thereon disposed in axial alignment with each other; and a handling member operatively associated with said hinge means and extending axially longitudinally from the opposed socket means of said hinge member to provide means for positioning said hinge member in the lingual section of the dental appliance.

15. A plastic pattern for a latch member for use in a dental appliance for hingedly mounting and releasably securing a labial bar for swingable clamping movement and engagement with respect to a lingual section in said appliance and including: a body portion having a longitudinal axis and an external recess formed therein and providing opposed inwardly extending and upwardly and downwardly facing shoulders at the lower and upper ends, respectively, of said recess; retainer means projecting longitudinally axially outwardly from at least one of the opposite ends of said body portion; and elongate handling means connected with and extending axially longitudinally from said retainer means.

16. A latch member for use in a dental appliance for hingedly mounting and releasably securing a labial bar for swingable clamping movement and engagement with respect to a lingual section in said appliance and including: a body portion having a longitudinal axis and an external recess formed therein and having a projecting cylindrical peripheral base surface extending through an angle of approximately 180 degrees about the longitudinal axis of the body portion and providing opposed inwardly extending and upwardly and downwardly facing shoulders at the lower and upper ends, respectively, of said recess, cruciform retainer means projecting longitudinally axially outwardly from at least one of the opposite ends of said body portion; and elongate handling means connected with and extending axially longitudinally from the cruciform retainer means.

17. A latch member of the character set forth in claim 16, wherein said elongate handling means is formed of volatile plastic connected with and extending axially longitudinally from the cruciform retainer means.

18. A latch member for use in a dental appliance for hingedly mounting and releasably securing a labial bar for swingable clamping movement and engagement with respect to a lingual section in said appliance and including: a body portion having a longitudinal axis and an external recess formed therein and providing opposed inwardly extending and upwardly and downwardly facing shoulders at the lower and upper ends, respectively, of said recess; retainer means projecting longitudinally axially outwardly from the opposite ends of said body portion; elongate handling means connected with and extending axially longitudinally from at least one of the retainer means of the latch member; and radially projecting positioning means on said handling means disposed in longitudinal alignment with and lying in a plane extending centrally through the recess of said body portion.

19. A latch member of the character set forth in claim 18 wherein: said external recess in said body portion has a projecting cylindrical peripheral base surface extending through an angle of approximately 180 degrees about the longitudinal axis of the body portion and disposed between said opposed inwardly extending and upwardly and downwardly facing shoulders at the lower and upper ends, respectively, of said recess; elongate handling means are connected with and extend axially longitudinally from the cruciform retainer means at each end of the latch member; and radially projecting positioning means is provided on each of said handling means disposed in longitudinal alignment with each other and lying in a plane extending centrally through the cylindrical peripheral surface of the recess of said body portion.

20. A pattern for a latch member for use in a dental appliance for hingedly mounting and releasably securing a labial bar for swingable clamping movement and engagement with respect to a lingual section in said appliance and including: a body portion having a longitudinal axis and an external recess formed therein and providing opposed inwardly extending and upwardly and downwardly facing shoulders at the lower and upper ends, respectively, of said recess; retainer means projecting longitudinally axially outwardly from the opposite ends of said body portion; elongate handling means connected with and extending axially longitudinally from at least one of the retainer means of the latch member; and radially projecting positioning means on said handling means disposed in longitudinal alignment with and lying in a plane extending centrally through the recess of said body portion, wherein said body portion, said cruciform retainer means projecting longitudinally axially outwardly from the opposite ends of said body portion, and said elongate handling means are formed of volatile plastic.

21. A member for use in a dental appliance for hingedly mounting and releasably securing a labial bar for swingable clamping movement and engagement with respect to a lingual section in said appliance and including: a body portion; and retainer means projecting outwardly from at least one of the exterior surfaces of said body portion.

22. A member for use in a dental appliance for hingedly mounting and releasably securing a labial bar for swingable clamping movement and engagement with respect to a lingual section in said appliance and including: a body portion; and retainer means projecting outwardly from at least one of the exterior surfaces of said body portion; said retainer means and at least a portion of said body portion being securable in said lingual section of said appliance for holding said member against movement with respect to said lingual section.

23. A member for use in a dental appliance for hingedly mounting and releasably securing a labial bar for swingable clamping movement and engagement with respect to a lingual section in said appliance and including: a body portion; and retainer means projecting outwardly from at least one of the exterior surfaces of said body portion; said retainer means and at least a portion of said body portion being securable in said lingual section of said appliance for holding said member against movement with respect to said lingual section, said body member having a portion disposed without said lingual section and engageable by said labial bar.

24. A member adapted to be secured in a lingual section of a dental appliance for hingedly mounting and securing a labial bar for swingable clamping movement and engagement with respect to said lingual section in said appliance and including: a body portion; retaining means projecting longitudinally from at least one of the exterior surfaces of said body portion and adapted to be secured in said lingual section of said appliance with a part of said body portion for holding said body portion securely connected with said lingual section of said appliance; said body portion having a section exposed with respect to the lingual section of said dental appliance and held rigidly in such exposed position by said retainer means.

25. A member adapted to be secured in a lingual section of a dental appliance for hingedly mounting and securing a labial bar for swingable clamping movement and engagement with respect to said lingual section in said appliance and including: a body portion; retaining means projecting longitudinally from at least one of the exterior surfaces of said body portion and adapted to be secured in said lingual section of said appliance with a part of said body portion for holding said body portion securely connected with said lingual section of said appliance; said body portion having a section exposed with respect to the lingual section of said dental appliance and held rigidly in such exposed position by said retainer means; said exposed portion of said body portion having means thereon disposed to be engageable by said labial bar.

References Cited

UNITED STATES PATENTS

| | | | |
|---|---|---|---|
| 2,127,858 | 8/1938 | Brecht | 32—5 |
| 2,508,546 | 5/1950 | Skinner | 164—246 |
| 2,797,456 | 7/1957 | Zahn | 164—246 |
| 2,797,482 | 7/1957 | Zahn | 32—5 |
| 3,094,778 | 6/1963 | Mailland | 32—5 |

ROBERT PESHOCK, Primary Examiner

PO-1050
(5/69)

UNITED STATES PATENT OFFICE
CERTIFICATE OF CORRECTION

Patent No. 3,486,230                    Dated   December 30, 1969

Inventor(s) Joe J. Simmons

It is certified that error appears in the above-identified patent and that said Letters Patent are hereby corrected as shown below:

```
Col. 2, line 54, for "of" (first occurrence) read --or--
Col. 4, line 32, after "FIG. 6a" insert a parenthesis mark
Col. 4, rewrite line 66 to read --wardly extending downwardly
        facing upper shoulder 54a--
Col. 4, line 68, cancel "of" (first occurrence)
Col. 5, line 12, for "26" read --62--
Col. 5, line 30, for "1" read --61--
Col. 13, line 10, for "sadi" read --said--
```

SIGNED AND
SEALED
JUN 23 1970

(SEAL)
Attest:

Edward M. Fletcher, Jr.
Attesting Officer

WILLIAM E. SCHUYLER, JR.
Commissioner of Patents